United States Patent [19]
Manlove et al.

[11] Patent Number: 6,078,154
[45] Date of Patent: Jun. 20, 2000

[54] CIRCUITRY FOR DETERMINING ACTUATOR POSITION

[75] Inventors: Gregory Jon Manlove, Kokomo; Paul M. Werking, Tipton; Wayne Alan Madsen; James Leo Kohler, both of Kokomo, all of Ind.

[73] Assignee: Delco Electronics Corporation, Kokomo, Ind.

[21] Appl. No.: 09/249,339

[22] Filed: Feb. 12, 1999

[51] Int. Cl.[7] .................................. H02P 6/08; H02P 7/06
[52] U.S. Cl. .................. 318/293; 388/907.2; 388/907.5; 388/909
[58] Field of Search .................................... 318/280, 287, 318/293, 294, 254, 663, 432; 388/907.2, 907.5, 909

[56] References Cited

U.S. PATENT DOCUMENTS

| | | | |
|---|---|---|---|
| 3,229,181 | 1/1966 | Evans | 318/293 |
| 3,870,937 | 3/1975 | Ban | 318/293 X |
| 4,575,662 | 3/1986 | Lehnhoff | 318/282 |
| 4,924,158 | 5/1990 | Kelley et al. | 318/434 |
| 4,972,133 | 11/1990 | Hirota et al. | 318/646 |
| 5,153,492 | 10/1992 | Landseadel | 318/599 |
| 5,172,037 | 12/1992 | Suck | 318/293 |
| 5,287,046 | 2/1994 | Carpenter et al. | 318/293 |
| 5,343,382 | 8/1994 | Hale et al. | 363/98 |
| 5,459,654 | 10/1995 | Williams et al. | 363/98 |
| 5,798,624 | 8/1998 | Wilke et al. | 318/254 |
| 5,859,519 | 1/1999 | Archer | 318/801 |

*Primary Examiner*—Bentsu Ro
*Attorney, Agent, or Firm*—Jimmy L. Funke

[57] ABSTRACT

Circuitry (100, 100') for determining actuator position includes four MOS transistors (T1–T4) connected to each side of a bi-directional motor (10). The current flowing through the motor (10) at any given time is proportional to voltages developed across the internal impedances of the transistors (T1–T4). The resulting motor voltages are amplified and high-pass filtered to remove any DC offsets due to the signal amplification. The conditioned motor voltages are then compared to one or more threshold voltages and passed through a one shot circuit (120) to provide detectable pulses for each motor commutation event. Circuitry (106,107) is provided for counting pulses provided by the one shot circuit (120) and, based on a desired motor position, for providing a number of digital control signals to a digital control circuit (104). Digital control circuit (104) is responsive to the number of digital control signals to control the gate voltages of the four transistors (T1–T4) to thereby control the position of the motor (10).

13 Claims, 6 Drawing Sheets

6,078,154

1

CIRCUITRY FOR DETERMINING ACTUATOR POSITION

FIELD OF THE INVENTION

The present invention relates generally to circuitry for determining actuator position, and more specifically to such circuitry for detecting motor commutation pulses for determining motor position.

BACKGROUND OF THE INVENTION

It is frequently necessary to track the position of a motor or other actuator in feedback, servo or similar systems. In automotive air conditioning systems, for example, a DC permanent magnet motor is typically used to drive a ventilation door so that hot and cold air flows are mixed together in such proportions that a desired temperature of ventilation air results. In these and other actuator control systems, a feedback signal is typically provided to indicate the position of the actuator or motor. The feedback signal is used as an error signal in a control loop, wherein the control loop is employed in a known manner to force the error signal to zero. The generation of accurate motor or actuator position information is accordingly paramount in maintaining an accurate control system.

One known technique for tracking actuator position utilizes a stationary balancing resistor having a moveable wiper attached to an actuator arm. As the arm rotates or otherwise moves, the wiper moves over the resistor. The resistance of the balancing resistor thus changes with position of the actuator arm, and an electrical signal proportional to the arm position is thereby generated. This position determining technique, however, has a number of problems associated therewith. For example, the accuracy of the electrical signal is typically poor, thereby limiting the accuracy of the feedback loop system. Moreover, drive motors in such systems are typically prohibitively expensive due to the variable resistor circuit requirement. Further, at least one additional external wire is needed in this application for directing the variable resistor signal back to the control loop, thereby reducing the reliability of the system and increasing its cost. Further still, the variable resistor signal is, by its nature, sensitive to noise over a broad frequency spectrum.

Another known technique for determining actuator or motor position utilizing circuitry for detecting and counting motor commutation pulses is disclosed in U.S. Pat. No. 5,132,602, an embodiment of which is illustrated in FIG. 1. Referring to FIG. 1, a motor drive circuit 12 is used to drive or otherwise move a DC permanent magnet motor 10 by applying a DC voltage across it. This DC voltage generates an average current which fluctuates as a result of the motor commutations. A typical motor current generated by the motor 10 of FIG. 1 is illustrated in FIG. 2 wherein the motor current has a continuously varying waveform. However, the motor current is periodically interrupted due to the action of the motor brushes wherein these interruptions result in steep pulses 30 and 32 in the motor current wave form.

The motor current is converted to a voltage at node 14 through the use of a resistor $R_{SENSE1}$ connected to ground potential, or a current sense transformer. The voltage signal 16 is coupled to an inverter 18 via capacitor C1 and the resulting inverted signal 22 is applied to a filter and amplifier circuit 24. The resulting voltage signal 22 in conjunction with the amplifier and filter produce enough amplitude to trigger a comparator function of circuit 24 on each commutation of the motor 10. The comparator output is provided to a one shot circuit 25 which generates a pulse 26 that remains

2 active until the electrical commutation signal has decayed, thereby assuring one pulse per commutation event. Pulse waveform 26 is supplied to a microprocessor 28 which includes a pulse counter 27 that increments (or decrements) a count value when the motor 10 moves in one direction as a pulse occurs. The pulse counter 27 provides a control signal to a drive control circuit 29 of microprocessor 28 which, in turn, feeds back the control signal to the motor drive circuit 12 to thereby control motor 10 to the desired position.

The motor position control system of FIG. 1 eliminates several problems associated with the variable resistor application described above, but still has several problems associated therewith. For example, a current sense transformer is typically prohibitively expensive and has a significant variation in operational characteristics over temperature, and so a sense resistor $R_{SENSE1}$ is typically used in such applications. Moreover, under motor brake conditions, the motor current circulates within the loop of the motor 10 and the driver circuit 12, thereby making this condition very difficult to sense using $R_{SENSE1}$. Further, the circuitry just described with respect FIG. 1 is generally operable to drive motor 10 in only a single direction, and a second resistor $R_{SENSE2}$, capacitor C2 and inverter circuit 20 are typically required, as shown in phantom in FIG. 1, for bi-directional control of motor 10.

Yet another known system for tracking the position of an actuator or motor is described in U.S. Pat. No. 5,514,977, and one embodiment of such a circuit is illustrated in FIGS. 3 and 4. In this implementation, a motor drive circuit 12 is utilized, as discussed above, to drive motor 10 wherein a sense resistor $R_{SENSE}$ is positioned in series between the motor drive circuit 12 and motor 10 to thereby produce a motor voltage signal at circuit node 34. The opposite end of motor 10 is connected to a capacitor C2, the opposite end of which is connected to a coupling resistor $R_{COUPLING}$, which is connected to ground potential 36. Circuit node 34 is connected to the common connection of C2 and $R_{COUPLING}$, and to one end of a capacitor C1. The opposite end of C1 is applied to one input 40 of an amplifier A1, wherein the opposite input of amplifier A1 is connected to a reference potential defined by resistors R3 and R4. The signal at the input of input 40 rides on a second reference signal established by resistors R1 and R2, wherein R1 and R3 are connected to a suitable voltage reference $V_{REG}$ 38, and resistors R2 and R4 are connected to ground potential 36. Dual outputs of amplifier A1 are supplied to inputs of a second amplifier A2 which converts the signals to a signal output at amplifier output 44 which is itself connected to an input of a third amplifier A3 having another input connected to a second reference voltage $V_{REF}$. Dual outputs of amplifier A3, an example of which is shown at 50 and 52, are connected to inputs 46 and 48 of amplifier A4, which is shown in FIG. 4. An output of amplifier A4 is provided to a non-inverting input of a comparator 90, wherein comparator 90 includes an inverting input connected to voltage reference $V_{REF}$. A single output of comparator 90 is provided to a latch circuit 92, the output of which is provided to a one shot circuit 96. The output 94 of one shot circuit 96 provides a pulse train which is counted by a counter circuit similar to that described with reference to FIG. 1. Amplifier A4 is a full-wave rectifier circuit, so bi-directional signals are sensed. Furthermore, because the sense resistor $R_{SENSE}$ is disposed in series between motor 10 and motor drive circuit 12, the circuit is sensitive during motor braking operation.

The implementation illustrated and described with respect to FIGS. 3 and 4 eliminate several of the problems associated with the systems illustrated in FIGS. 1 and 2, but the circuit of FIGS. 3 and 4 still has a number of problems associated therewith. For example, under a motor braking condition, if both outputs of the motor drive circuit 12 are pulled low (which is preferable to minimize noise) the sense resistor output signal deviates significantly below ground. External blocking capacitor C1 is therefore required to eliminate the large negative transient associated with this condition. This blocking capacitor requires an additional input pad on the integrated circuit which is large in area and results in a potential reliability problem. Moreover, a resistor $R_{SENSE}$ in series with the motor 10 limits the maximum torque that may be applied to a load. If a higher current motor is used, a series resistor may not be acceptable due to motor start up requirements. Additionally, in the circuit of FIGS. 3 and 4, all of the system gain is applied prior to the comparator 90 whereby any circuit DC offsets are multiplied by this gain and will result in sufficient variations in circuit sensitivity between the positive and negative pulses. Depending on which direction such offsets occur, this may cause real pulses to be missed or may allow noise to generate undesired false pulses. Positional errors result in either case. Still another problem associated with the series resistor $R_{SENSE}$ is the increased sensitivity of the sensing circuit to electromagnetic interference which results in additional false pulses and positional errors. Such a series resistor $R_{SENSE}$ coupled with the inductance of the motor 10 further causes a large amplitude, high speed transient signal to be generated whenever the motor is either started or stopped in one direction. In other words, a large spike is generated whenever power is applied or removed from the output of the motor drive circuit 12 connected to sense resistor $R_{SENSE}$. However, if this output is grounded while the other output switches, then no spike is generated on the sense resistor $R_{SENSE}$. Therefore, these "false start pulses" and "false stop pulses" are generated only in one motor direction. These false pulses have a wide bandwidth and are difficult to filter out, although it is possible to remove these pulses algorithmically by inhibiting the one shot circuit 96 whenever the appropriate motor drive output switches states. This technique, however, does not entirely address the problem since actual motor commutations may occur when starting or stopping motor 10. These artificial missing pulses have a directional bias, and can accordingly result in significant positional errors over time.

What is therefore needed is improved circuitry for determining actuator or motor position which eliminates or at least minimizes the above-described problems associated with prior art systems.

SUMMARY OF THE INVENTION

The foregoing shortcomings of the prior art are addressed by the present invention. In accordance with one aspect of the present invention circuitry for determining actuator position comprises a first drive device having a signal input adapted for connection to a supply voltage, an output adapted for connection to a first input of an actuator and a control input responsive to a first control signal for conducting a first load current through an internal impedance of the first drive device defined between the signal input and the output thereof, the first load current thereby defining a first load voltage at the output of the first drive device. A second drive device is provided having a signal input adapted for connection to a second input of the actuator, an output adapted for connection to a reference potential and a control input responsive to a second control signal for conducting the first load current therethrough from the signal input to the output of the second drive device, the first load current defining a second load voltage at the signal input of the second drive device, wherein the first and second drive devices are adapted for driving the actuator in a first direction via the first load current. Further included is a means responsive to one of the first and second load voltages for detecting voltage pulses associated therewith, and means responsive to the voltage pulses for controlling activation and deactivation of the first and second control signals.

One object of the present invention is to provide improved circuitry for determining and controlling the position of an actuator or motor.

These and other objects of the present invention will become more apparent from the following description of the preferred embodiments.

DESCRIPTION OF THE PREFERRED EMBODIMENTS

Figures 1, 2:
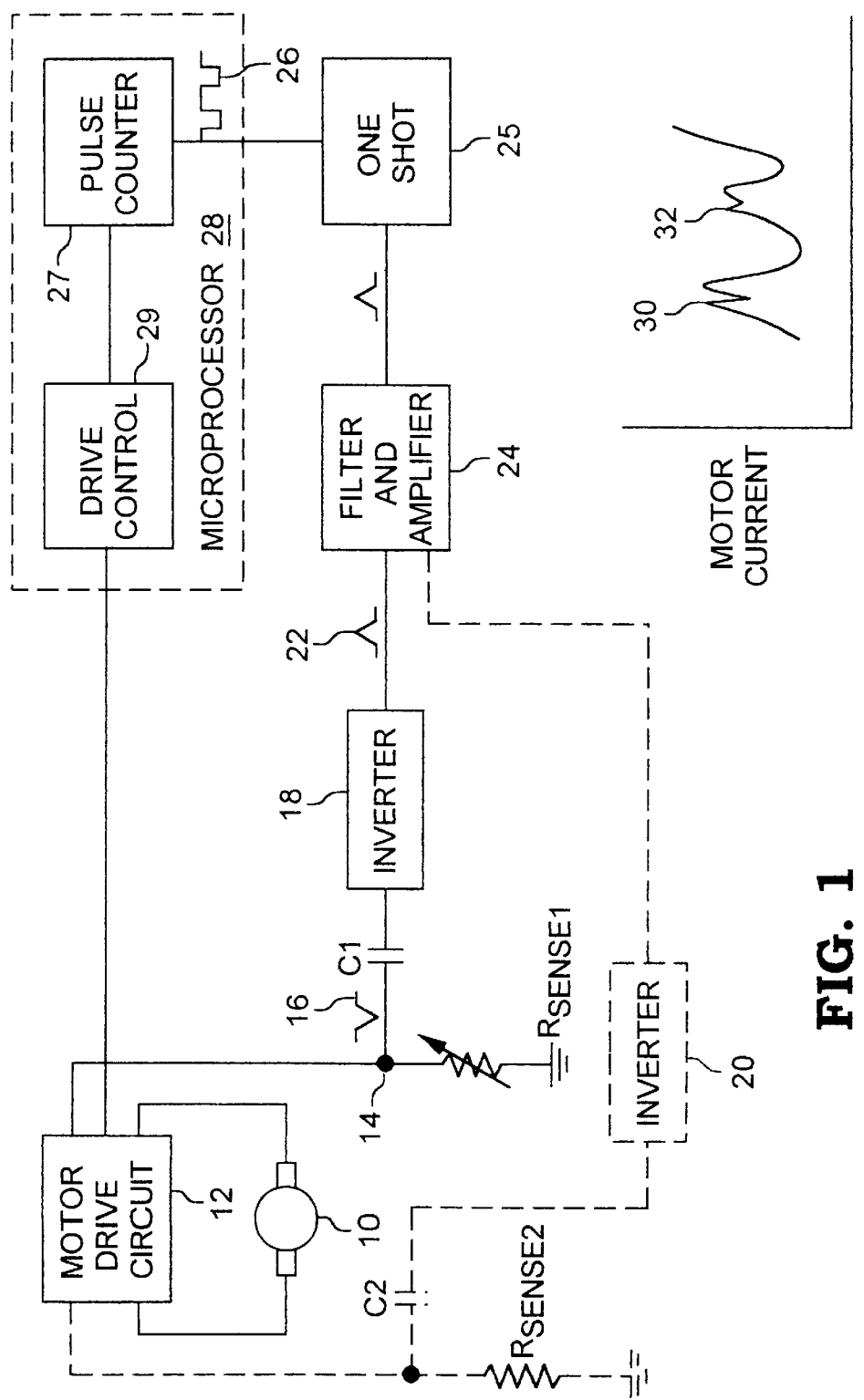
FIG. 1 is a block diagram illustration of one prior art circuit for controlling the position of an actuator or motor.
FIG. 2 is a plot of a motor current waveform of the motor 10 in the prior art control circuit of FIG. 1.
Figure 3:
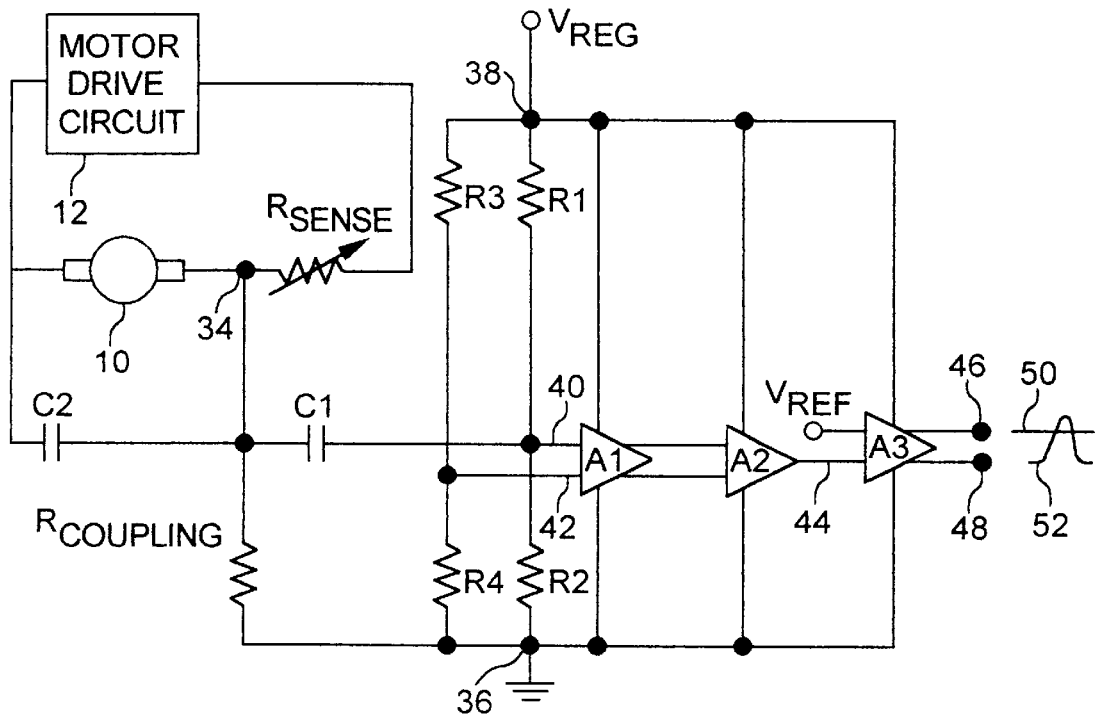
FIG. 3 is a block diagram of one embodiment of another prior art circuit for controlling the position of an actuator or motor.
Figure 4:
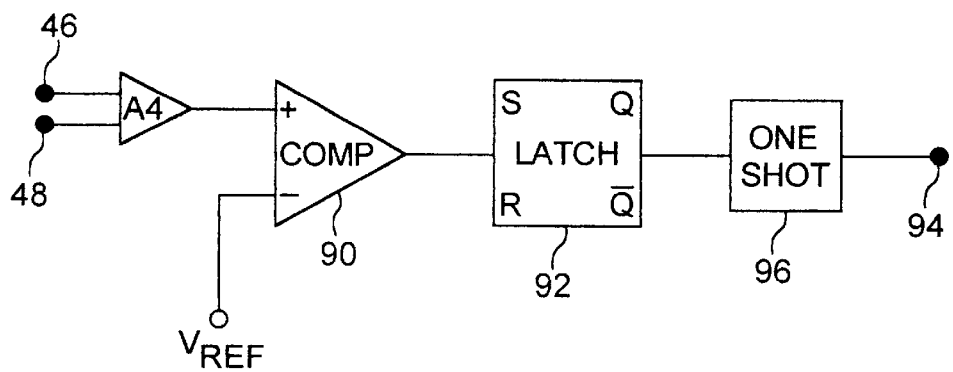
FIG. 4 is a block diagram illustrating further circuitry associated with the circuit illustrated in FIG. 3.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further application of the principles of the invention as illustrated therein being contemplated as would normally occur to one skilled in the art to which the invention relates.

Figure 5:
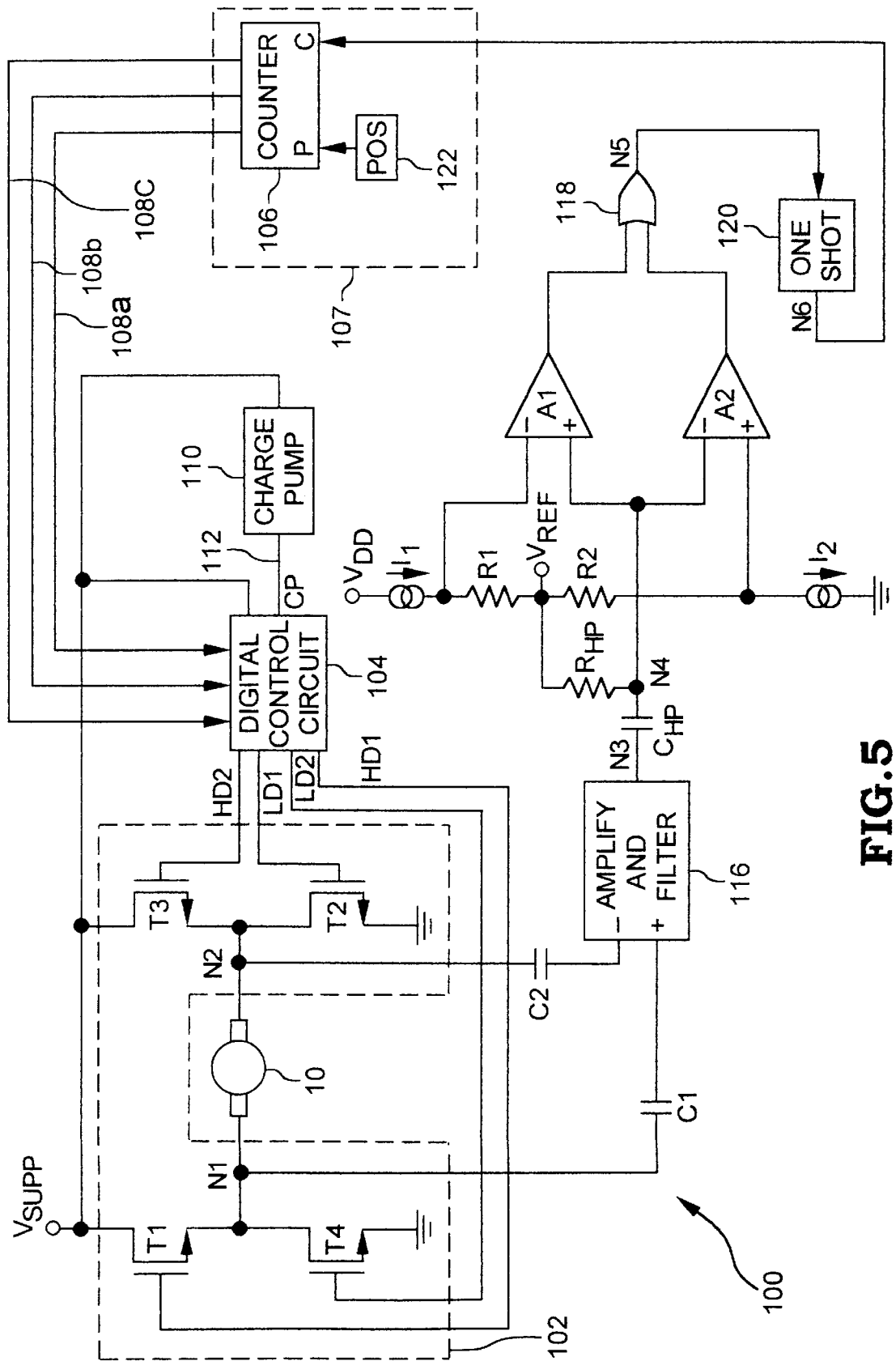
FIG. 5 is a block diagram illustrating one preferred embodiment of a circuit for determining actuator position, in accordance with the present invention.

Referring now to FIG. 5, one embodiment of circuitry 100 for determining actuator or motor position, in accordance with the present invention, is shown. Circuitry 100 includes a motor drive circuit 102 including a first transistor T1, which is preferably a metal-oxide-semiconductor (MOS)

transistor, having a drain connected to a supply voltage $V_{SUPP}$, a gate connected to an output HD1 of a digital control circuit 104 and a source connected to a circuit node N1. A second MOS transistor T2 includes a drain connected to a circuit node N2, a gate connected to an output LD1 of digital control circuit 104 and a source connected to ground potential. A third MOS transistor T3 includes a drain connected to $V_{SUPP}$, a gate connected to output HD2 of digital control circuit 104 and a source connected to circuit node N2. A fourth MOS transistor T4 includes drain connected to circuit node N1, a gate connected to output LD2 of digital control circuit 104 and a source connected to ground potential. A motor 10, which is preferably a permanent magnet DC motor, includes a first motor terminal connected to circuit node N1 and a second motor terminal connected to circuit node N2. Motor 10 is capable, via appropriate actuation of transistors T1–T4, of operation in either direction (clockwise or counterclockwise) and of braking operation, as will be described in greater detail hereinafter.

Node N1 is further connected to one end of a capacitor C1, the opposite end of which is connected to a non-inverting input of an amplifying and filtering circuit 116 of known construction. Node N2 is connected to one end of another capacitor C2, the opposite end of which is connected to the inverting input of amplifying and filtering circuit 116. An output of amplifying and filtering circuit 116 defines a circuit node N3 which is connected to one end of a capacitor $C_{HP}$, the opposite end of which is connected to circuit node N4. Circuit node N4 is connected to one end of a resistor $R_{HP}$, the opposite end of which is connected to one end of a resistor R1, to one end of a resistor R2 and to a voltage source $V_{REF}$. Circuit node N4 is further connected to a non-inverting input of a comparator A1 of known construction and to an inverting input of a second comparator A2 of known construction. The opposite end of R1 is connected to an output of a current source $I_1$ and to the inverting input of comparator A1. The opposite end of current source $I_1$ is connected to a voltage source $V_{DD}$. The opposite end of R2 is connected to an input of a second current source $I_2$ and to the non-inverting input of comparator A2. The opposite end of current source $I_2$ is connected to ground reference.

The output of comparator A1 is connected to one input of an OR-gate 118 of known construction and the output of comparator A2 is connected to a second input of OR-gate 118. The output of OR-gate 118 defines a circuit node N5 and is connected to an input of a one shot circuit 120 of known construction. An output of one shot circuit 120 defines a circuit node N6 and is connected to a counting input C of a counter circuit 106. Counter circuit 106 is of known construction and includes a second input P connected to a terminal POS 122. Counter circuit 106 has three output signal lines 108A, 108B, and 108C each connected to corresponding inputs of a digital control circuit 104. It is to be understood that while counter circuit 106 is shown in FIG. 5 as having three output signal lines 108A–108C, counter circuit 106 may be configured to include any number of output signal lines connected to corresponding inputs of digital control circuit 104. Alternatively, counter circuit 106 and POS terminal 122 may comprise at least a portion of a control computer 107, such as a microprocessor, as shown in phantom in FIG. 5.

Circuit 100 further includes a charge pump circuit 110 of known construction wherein charge pump circuit 110 includes an input connected to voltage source $V_{SUPP}$ and an output signal path 112 connected to digital control circuit 104. Digital control circuit 104 further includes a signal line connected to voltage $V_{SUPP}$. In operation, digital control circuit 104, which is preferably of known construction, is responsive to digital signals provided thereto via counter circuit 106 (or control computer 107) on signal paths 108A–108C to control the gate voltages of transistors T1–T4 as will be described more fully hereinafter.

In accordance with the present invention, circuit 100 is not operable to develop a motor voltage signal across a sense resistor as in prior art circuits, but is rather operable to utilize the internal impedances of transistors T1–T4 to develop a motor voltage waveform suitable for detecting motor commutation pulses. To achieve this desired operation, motor driver circuit 102 is preferably comprised of metal-oxide-semiconductor (MOS) devices since these devices exhibit resistive characteristics when the source voltage is negative or positive with respect to the drain voltage. This characteristic is different in bipolar devices which are therefore preferably not used in motor driver circuit 102. For example, when a collector of a NPN transistor is within a saturation voltage of its emitter, the device exhibits a certain characteristic resistance. If, however, an inductive current transition causes the collector voltage to drop below the saturation voltage of the NPN transistor, the device is virtually an open circuit until the collector voltage drops to more than one base-emitter voltage (Vbe) below ground potential. This creates very unusual motor voltage waveforms and makes it difficult to detect valid commutation pulses. Accordingly, the present invention preferably utilizes MOS devices in the motor driver circuit 102 so that the impedances of these devices may be used to convert motor current to a motor voltage suitable for detection of the motor commutation pulses.

In one embodiment of the present invention, transistors T1 and T3 are preferably n-channel MOS transistors, as p-channel transistors tend to require a much larger silicon area and may therefore be cost prohibitive in the total silicon area required by circuit 100. To achieve a desired impedance in transistors T1 and T3 with n-channel MOS transistors, the gates of these devices must be driven above the supply voltage $V_{SUPP}$ by more than a gate-source threshold voltage $V_T$. This assures that transistors T1 and T3 are in a valid operating region exhibiting a linear resistance. To achieve such gate voltages, charge pump circuit 110 is provided for increasing the supply voltage $V_{SUPP}$ to a suitable voltage CP above $V_{SUPP}$, in a known manner, wherein charge pump circuit 110 supplies the voltage CP to digital control circuit 104 via signal path 112. Digital control circuit 104 is operable to drive transistors T1 and T3 at the increased voltage CP via signal lines HD1 and HD2. Those skilled in the art will recognize that in applications wherein circuit real estate is not restricted, transistors T1 and T3 may be provided as p-channel devices, and charge pump circuit 110 may accordingly be omitted.

To operate motor 10 in a particular direction, digital control circuit 104 is operable to activate transistors T1 and T2, via appropriate voltage signals on signal lines HD1 and LD1 respectively, while deactivating transistors T3 and T4 via appropriate control of voltages on signal paths HD2 and LD2 respectively. To operate the motor 10 in the opposite direction, digital control circuit 104 is operable to activate transistors T3 and T4 via appropriate voltages on signal paths HD2 and LD2, while deactivating transistors T1 and T2 via appropriate voltages on signal paths HD1 and LD1. To brake the motor 10, digital control circuit 104 is operable to activate transistors T2 and T4 via appropriate voltages on signal paths LD1 and LD2 respectively, while deactivating transistors T1 and T3 via appropriate voltages on signal paths HD1 and HD2 respectively. Digital control circuit 104 is operable, in a known manner, to decode the digital inputs provided thereto by counter circuit 106 (or control computer 107) via signal paths 108A–108C to determine the appropriate gate voltages of transistors T1–T4. Again, the charge pump circuit 110 provides a voltage CP sufficiently above the supply voltage $V_{SUPP}$ to assure that transistors T1 and T3, when activated, exhibit linear impedances. The combination of the charge pump circuit 110, digital control circuit 104 and motor driver circuit 102 are sufficient to drive the motor 10 in either direction, and to brake the motor 10, while the remaining circuitry illustrated in FIG. 5 is operable to control the motor 10 to a desired position.

Figure 6A:
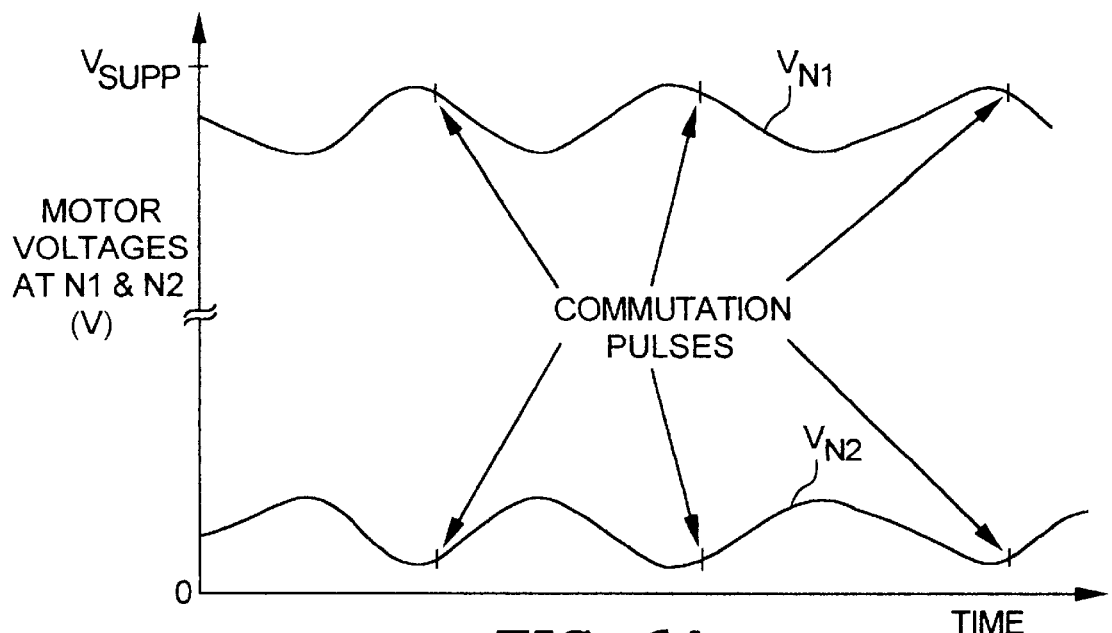
FIG. 6 is composed of FIGS. 6A–6C and illustrates circuit signals at various circuit nodes of the actuator position determining circuit of FIG. 5 during typical operation thereof.

Referring now to FIG. 6A, examples of the motor voltages developed at circuit nodes N1 and N2 are illustrated. The voltage $V_{N1}$ at circuit node N1, in either clockwise or counter-clockwise operation of motor 10, is a mirror image of the voltage $V_{N2}$ at circuit node N2. In the example waveform of FIG. 6A, node voltage $V_{N1}$ is shown as being typically between 0.1–1.0 volts below the supply voltage $V_{SUPP}$, which may typically be connected to battery voltage and accordingly be in the range of 12–15 volts. Node voltage $V_{N2}$ is conversely shown as being typically between 0.1–1.0 volts above ground potential. When the motor 10 is driven in the opposite direction, $V_{N1}$ becomes $V_{N2}$ and vice versa. In either case, the location of the motor commutation pulses relative to $V_{N1}$ and $V_{N2}$ are also illustrated in FIG. 6A.

Figure 6B:
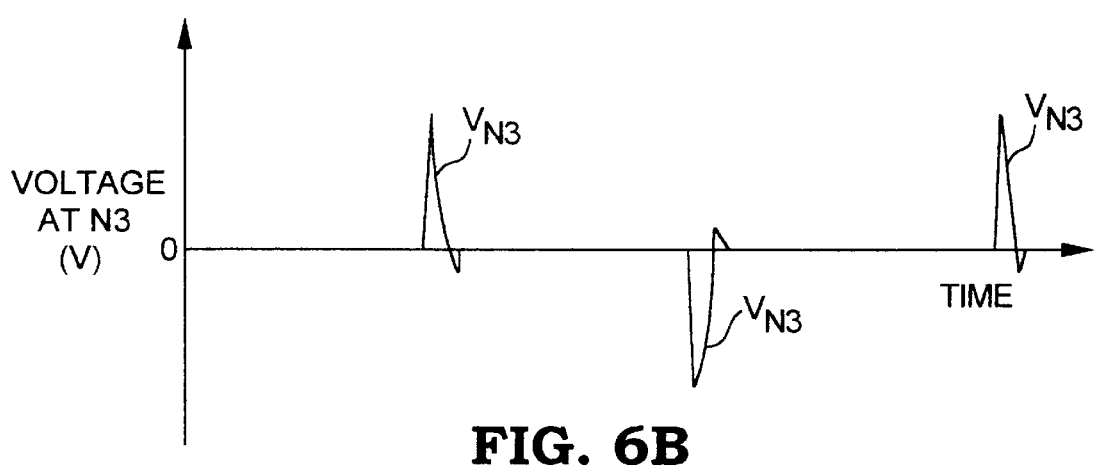

Referring again to FIG. 5, a commutation detection circuit is defined by the remaining circuitry illustrated therein and not yet discussed. Modulation in the motor current that occurs during activation of motor 10 creates a voltage modulation on the drain-to-source voltages of transistors T1–T4 at circuit nodes N1 and N2, as illustrated by example in FIG. 6A, wherein the DC component of these voltages at nodes N1 and N2 are typically either near ground potential or the input supply voltage $V_{SUPP}$. In either case, the voltages at nodes N1 and N2 are applied to differential amplifier 116 through capacitors C1 and C2 respectively, wherein C1 and C2 provide a high pass function and block the DC component of the node voltages at nodes N1 and N2. The filter function of amplifying and filtering circuit 116 is preferably a known low pass filter, whereby the low pass filter of amplifying and filtering circuit 116 in conjunction with the high pass function of capacitors C1 and C2 generate a bandpass filter function that allows the DC components of the node voltages N1 and N2, as well as high frequency noises associated therewith, to be eliminated at the output of amplifying and filtering circuit 116 defined at node N3. The amplifying and filtering circuit 116 further converts the node voltages at circuit nodes N1 and N2 from a differential signal to a single ended output signal, and an example of the node voltage $V_{N3}$ is illustrated in FIG. 6B relative to the motor voltages $V_{N1}$ and $V_{N2}$ illustrated in FIG. 6A.

The combination of $C_{HP}$ and $R_{HP}$ provide a high pass filter having the dual functions of eliminating any DC offsets attributable to the gain and internal offsets of amplifying and filtering circuit 116.

Current source $I_1$ is preferably proportional to the internal impedances of the MOS transistors T1–T4 so that the desired current of $I_1$ for commutation detection is constant regardless of the operational characteristics of the motor driver devices T1–T4. The combination of current source $I_1$ and resistor R1 define a first reference voltage ($V_{REF}+I_1R1$) at the inverting input of comparator A1 such that when an input signal at node N4 exceeds this first reference voltage, the output of comparator A1 switches to a logic high state.

Figure 6C:
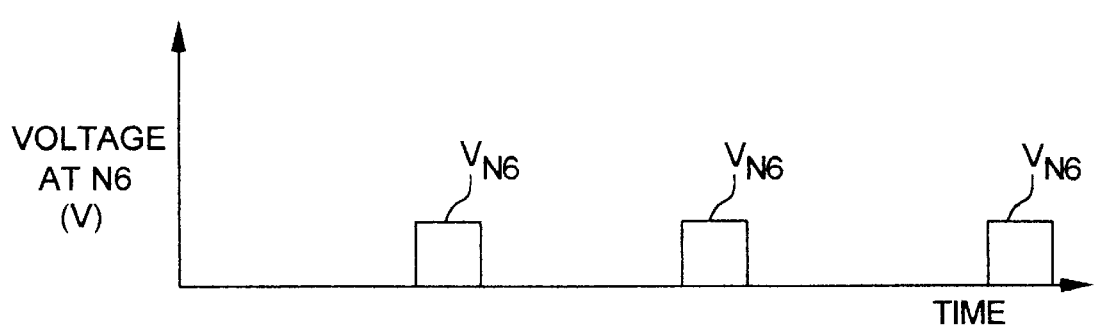

Because the motor driver circuit 102 is bi-directional, there is a need to detect negative motor voltage peaks as well as positive motor voltage peaks. This is accomplished by a symmetric detection circuit defined by resistor R2, current source $I_2$ and comparator A2. Current source $I_2$, like current source $I_1$, is preferably proportional to the internal impedances of the MOS transistors T1–T4 so that the desired current of $I_2$ for commutation detection is a constant regardless of the operational characteristics of motor driver devices T1–T4. Resistor R2 and current source $I_2$ define a second reference voltage ($V_{REF}-I_2R2$) at the non-inverting input of comparator A2 such that when the node voltage at circuit node N4 falls below this second reference voltage, comparator A2 switches to a logic high state. If the outputs of either comparator A1 or A2 are at a logic high state, the output of OR-gate 118 produces a logic high state for the duration of the motor commutation pulse. One shot circuit 120 is operable, as is known in the art, to maintain the logic high state at node N5 for the duration of a one shot pulse length at node N6. This assures only one pulse per cycle and allows the counter circuit 106 a sufficiently long pulse width to detect a commutation event, and an example of the node voltage $V_{N6}$ is illustrated in FIG. 6C relative to the motor voltages $V_{N1}$ and $V_{N2}$ illustrated in FIG. 6A and the node voltage $V_{N3}$ illustrated in FIG. 6B.

In one embodiment, the output of one shot circuit 120 is connected to a count input C of counter circuit 106. Counter circuit 106 also includes a second input P connected to a position terminal POS 122. Counter circuit 106 is operable to receive a digital word at input P, preferably via an off-board circuit such as a microprocessor (not shown), wherein the digital word is equal to the desired position of motor 10. Based on the desired motor position and the count value determined from the motor commutation pulses provided by one shot circuit 120, counter circuit 106 is operable to adjust the digital signals on signal paths 108A–108C, as is known in the art, whereby the digital control circuit 104 is responsive to such signals to correspondingly actuate transistors T1–T4. As previously described, counter circuit 106 and position terminal POS 122 may alternatively comprise at least a portion of a control computer 107, such as a microprocessor. The control computer 107 is operable in this embodiment to count pulses supplied thereto via one shot circuit 120, compare this count value to an internally generated position value, and produce appropriate digital signals on signal paths 108A–108C to thereby control the position of motor 10.

Figure 7:
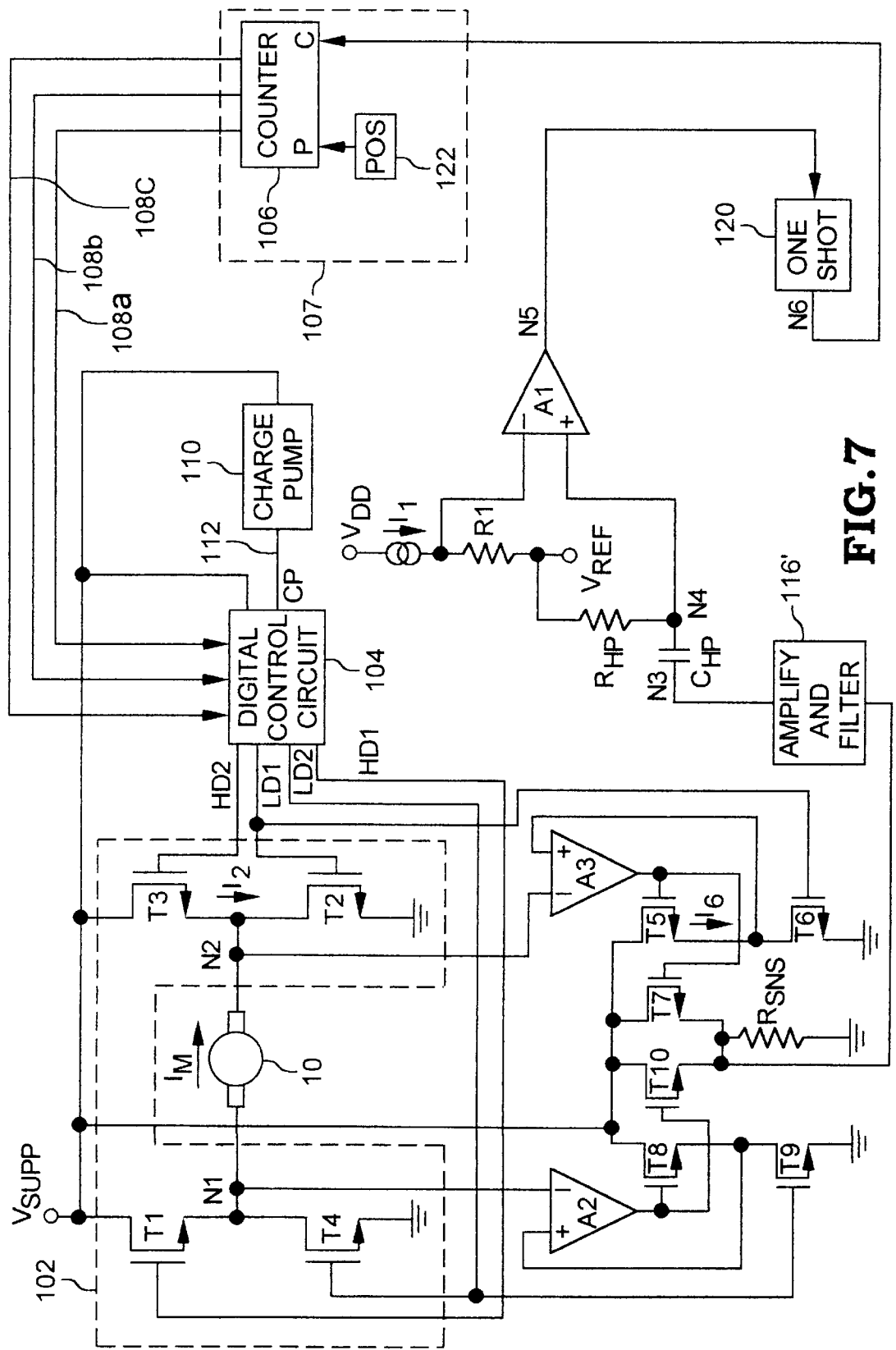
FIG. 7 is a block diagram illustrating an alternative embodiment of a circuit for determining actuator position, in accordance with the present invention.

Referring now to FIG. 7, an alternate embodiment of a circuit 100' for determining actuator or motor position, in accordance with the present invention, is shown. Circuit 100' is identical in many respects to circuit 100 of FIG. 5, and many of the details of the structure and operation of common circuit elements will accordingly be omitted here for brevity. Circuit 100' differs from circuit 100 in that capacitors C1 and C2 and amplifying and filtering circuit 116 are replaced by amplifiers A2 and A3, transistors T5–T10 and sense resistor $R_{SNS}$. Moreover, amplifier A2, resistor R2, current source $I_2$ and OR-gate 118 are omitted in circuit 100' and the output of comparator A1 is fed directly to the input of one shot circuit 120.

Within circuit 100', circuit node N2 is connected to an inverting input of amplifier A3, and the non-inverting input of amplifier A3 is connected to the source of a n-channel MOS transistor T5 and to the drain of a n-channel MOS transistor T6. The output of amplifier A3 is connected to the gate of T5, and the drain T5 is connected to supply voltage $V_{SUPP}$. The gate of T6 is connected to signal path LD1 and the source of T6 is connected to ground potential. The output of amplifier A3 is further connected to the gate of a n-channel MOS transistor T7, wherein the drain of T7 is connected to $V_{SUPP}$ and the source of T7 is connected to one end of a sense resistor $R_{SENS}$.

Circuit node N1 is connected to an inverting input of amplifier A2, wherein amplifiers A2 and A3 are of known construction. The non-inverting input of amplifier A2 is connected to the drain of a n-channel MOS transistor T9 and to the source of a n-channel MOS transistor T8. The gate of T8 is connected to the output of amplifier A2 and the drain of T8 is connected to supply voltage $V_{SUPP}$. The gate of T9 is connected to signal path LD2 and the source of T9 is connected to ground potential. The output of amplifier A2 is further connected to the gate of a n-channel MOS transistor T10, the drain of which is connected to $V_{SUPP}$. The source of T10 is connected to the common connection of the source of T7 and sense resistor $R_{SENS}$. The opposite end of $R_{SENS}$ is connected to ground potential. The common connection of the sources of T7 and T10 and resistor $R_{SENS}$ defines circuit node N3 which is connected to capacitor $C_{HP}$ as previously described with respect to FIG. 5.

Transistor T6 has a channel width W6 that is sized smaller than a channel width W2 of transistor T2. The gates and sources of T2 and T6 are connected together and the drain voltage of transistor T6 is forced to be the same as the drain voltage of transistor T2 by the high gain feedback loop comprised of amplifier A3 and transistor T5. The current I6 flowing through transistor T6 is therefore proportional to the current I2 flowing through transistor T2 according to the equation $$I6=(W6/W2)*I2.$$

Transistors T5 and T7 are preferably matched in area so that the current I6 also flows through transistor T7 and develops a voltage $V_{SNS}$ across sense resistor $R_{SNS}$ that is proportional to I6 according to the equation $$V_{SNS}=(W6/W2)*I2*R_{SNS}$$

It should be noted that when the current through T2 is negative, as it could be when motor 10 is entering a braking condition, the feedback loop of amplifier A3 and T5 attempt to drive the drain voltage of T6 below ground potential. In attempting to do this, transistors T5 and T7 are both cut-off and $V_{SNS}$ goes to zero. In other words, the current through $R_{SNS}$ is a rectified version of the current I2 flowing through motor 10 and transistor T2. It should also be noted that when the gate voltage applied to both T2 and T6 goes to zero, both of these transistors will be cut-off and the currents through them will accordingly be zero regardless of the voltages present at circuit node N2 and at the drain of T6. The output of A3 saturates and transistors T5 and T7 are again cut-off resulting in no voltage across $R_{SNS}$. This feature effectively isolates the voltage at $R_{SNS}$ from transients at node N2.

Whenever transistor T2 is on, the voltage $V_{SNS}$ across resistor $R_{SNS}$ is proportional to the current I2 through T2 which is equal to a load current $I_M$ flowing through the motor 10, according to the equation $$V_{SNS}=(W6/W2)*I_M*R_{SNS}.$$

An identical current sensing circuit comprising amplifier A2 and transistors T8–T10 is connected to circuit node N1 such that whenever the transistor T4 is on, the voltage $V_{SNS}$ across resistor $R_{SNS}$ is proportional to the negative of the motor load current $I_M$ according to the equation $$V_{SNS}=-(W9/W4)*I_M*R_{SNS},$$

wherein W9 is the channel width of transistor T9 and W4 is the channel width of transistor T4. Preferably, W2=W4=W and W6=W9=W' so that the voltage $V_{SNS}$ across resistor $R_{SNS}$ is proportional to the absolute value of the load current $I_M$ flowing through the motor according to the equation $$V_{SNS}=(W'/W)*|I_M|*R_{SNS},$$

wherein this last equation holds true during all three motor operational modes (clockwise, counter-clockwise and braking) since at least one of the transistors T2 or T4 will always be on.

The common connection of the sources of T7, T10 and $R_{SNS}$ is connected to a single input of an amplify and filter block 116', which is otherwise identical in structure and operation to block 116 of FIG. 5. The output of block 116' defines circuit node N3. Node N4 provides a voltage signal representative of motor pulses during any of the three motor operational modes to the non-inverting input of A1, wherein an inverting input of A1 is connected to a reference voltage defined by current source $I_1$, resistor R1 and the DC voltage $V_{REF}$, according to the equation $$V_{REF}+I_1R1.$$

As in circuit 100 of FIG. 5, current source $I_1$ is preferably proportional to the internal impedances of T1–T4. The output of A1 is fed directly to one shot circuit 120 wherein the remainder of the circuit 100' is identical in operation to circuit 100 described with respect to FIG. 5.

Figure 8:
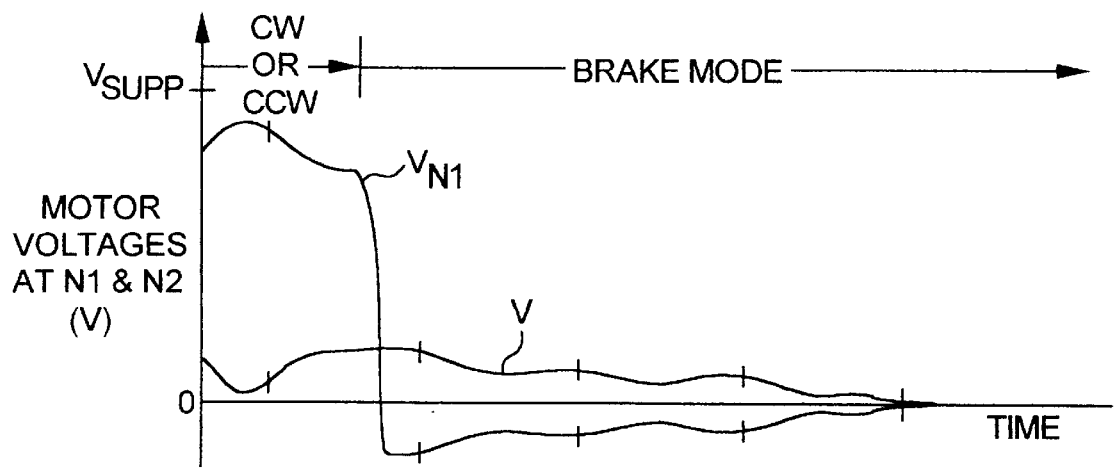
FIG. 8 is a plot illustrating motor operational signals of either of the circuits of FIG. 5 or FIG. 7 when switching from clockwise or counter-clockwise operation to braking operation thereof.
Figure 9A:
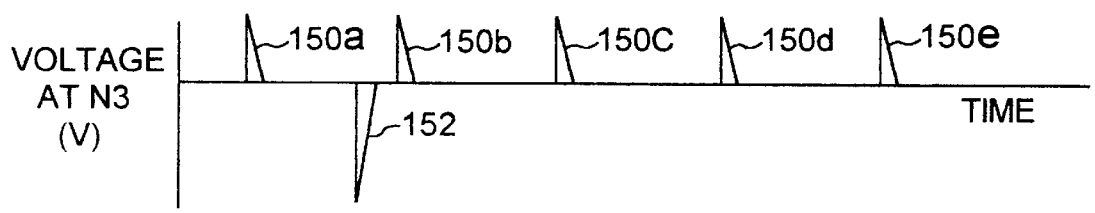
FIG. 9 is composed of FIGS. 9A and 9B and illustrates the effect of motor switching on the actuator position determining circuit of FIG. 5.
Figure 9B:
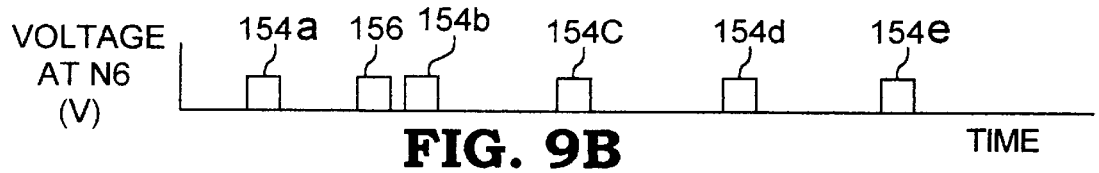
Figure 10A:
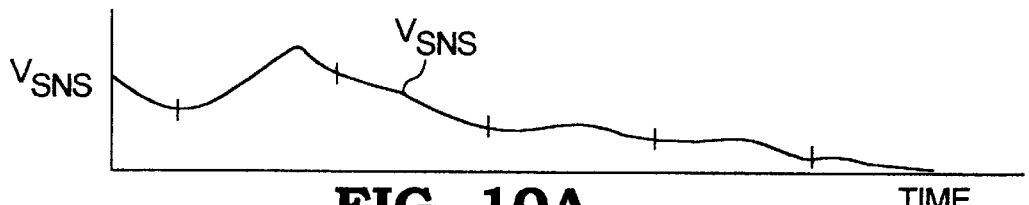
FIG. 10 is composed of FIGS. 10A–10C and illustrates the effect of motor switching on the actuator position determining circuit of FIG. 7.
Figure 10B:
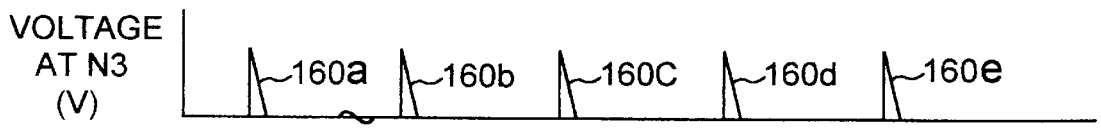
Figure 10C:
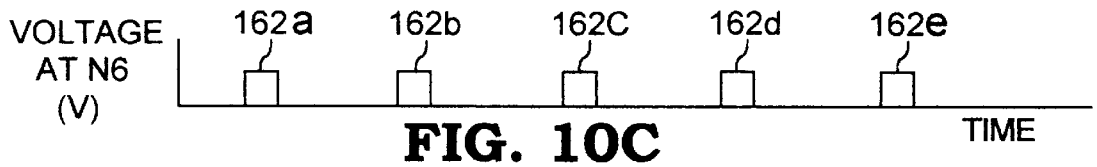

It should now be appreciated from the foregoing that the actuator position determining system of the present invention includes a motor drive circuit comprised of four MOS transistors operable to control an actuator or motor in clockwise, counterclockwise and braking operational modes. Internal impedances of the MOS transistors to used to develop voltage waveforms proportional to the motor current. The voltage waveforms are then amplified and filtered, compared to reference voltages, and shaped into countable pulses via commutation detection circuitry. A digital control circuit is operable to count the commutation pulses, compare the count value to a desired actuator or motor position, and control the MOS drive transistors to thereby control the actuator or motor to the desired position. While the embodiment illustrated and described with respect to FIG. 5 does not reject false start and stop pulses due to turn-on and turn-off transients, it is operable to catch such false pulses in both directions which is an improvement over known actuator position detection systems. Conversely, the embodiment illustrated and described with respect to FIG. 7 is operable to entirely reject such false pulses due to turn-on and turn-off transients. For example, referring to FIG. 8, motor voltages $V_{N1}$ and $V_{N2}$ are shown illustrating a motor braking operational mode following either a clockwise or counter-clockwise operational mode. Referring to FIG. 9A, the voltage signal at node N3 of circuit 100 of FIG. 5 is shown illustrating a number of motor commutation detections 150a–150e, corresponding to actual commutations of the motor 10, along with a negative transient 152 caused by the switching of motor 10 due to braking operation. As shown in FIG. 9B, the commutation detection circuitry of FIG. 5 is operable to not only provide proper voltage pulses 154a–154e at circuit node N6 (the output of one shot circuit 120), but also to provide a false pulse 156 corresponding to the negative transient 152. By contrast, referring to FIG. 10A, the voltage $V_{SNS}$ across $R_{SNS}$ in the circuit 100' of FIG. 7 is shown illustrating the effect thereon of the switching of motor 10 from clockwise or counter-clockwise operation to braking operation as illustrated in FIG. 8. As shown in FIG. 10B, the voltage peak in $V_{SNS}$ due to the switching of motor 10 to braking operation is insufficient to cause a commutation detection at circuit node N3 of circuit 100', and instead only valid commutation pulses 160a–160e are detected at N3. As a result, the voltage at node N6 of circuit 100' (output of one shot circuit 120) produces only voltage pulses 162a–162e corresponding to valid motor commutation events, as shown in the plot of FIG. 10C.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. Circuitry for determining actuator position, comprising:

a first drive device having a signal input adapted for connection to a supply voltage, an output adapted for connection to a first input of an actuator and a control input responsive to a first control signal for conducting a first load current through an internal resistance of said first drive device defined between said signal input and said output thereof, said first load current thereby defining a first load voltage at said output of said first drive device;

a second drive device having a signal input adapted for connection to a second input of the actuator, an output adapted for connection to a reference potential and a control input responsive to a second control signal for conducting said first load current therethrough from said signal input to said output of said second drive device, said first load current defining a second load voltage at said signal input of said second drive device, said first and second drive devices adapted for driving the actuator in a first direction via said first load current;

means responsive to one of said first and second load voltages for detecting voltage pulses associated therewith; and means responsive to said voltage pulses for controlling activation and deactivation of said first and second control signals.

2. The circuitry of claim 1 further including:

a third drive device having a signal input connected to said signal input of said first drive device, an output connected to said signal input of said second drive device and a control input responsive to a third control signal for conducting a second load current through an internal resistance of said third drive device defined between said signal input and said output thereof, said second load current thereby defining a third load voltage at said output of said third drive device; and a fourth drive device having a signal input connected to said output of said first drive device, an output connected to said output of said second drive device and a control input responsive to a fourth control signal for conducting said second load current therethrough from said signal input to said output of said fourth drive device, said second load current defining a fourth load voltage at said signal input of said fourth drive device, said third and fourth drive devices adapted for driving the actuator in a second opposite direction via said second load current;

and wherein said means responsive to one of said first and second load voltages for detecting voltage pulses associated therewith is further responsive to one of said third and fourth load voltages for detecting voltage pulses associated therewith;

and wherein said means responsive to said voltage pulses for controlling activation and deactivation of said first and second control signals is further responsive to said voltage pulses for controlling activation and deactivation of said third and fourth control signals.

3. The circuitry of claim 2 wherein said means responsive to one of said first and second load voltages and to one of said third and fourth load voltages for detecting voltage pulses associated therewith includes:

a first capacitor having one end connected to a common connection of said output of said first drive device and said signal input of said fourth drive device;

a second capacitor having one end connected to a common connection of said output of said third drive device and said signal input of said second drive device; and an amplifier circuit having a non-inverting input connected to an opposite end of said first capacitor, an inverting input connected to an opposite end of said second capacitor, and an output.

4. The circuitry of claim 3 wherein said means responsive to one of said first and second load voltages and to one of said third and fourth load voltages for detecting voltage pulses associated therewith further includes a high-pass filter having an input connected to said output of said amplifier circuit and an output.

5. The circuitry of claim 4 wherein said means responsive to one of said first and second load voltages and to one of said third and fourth load voltages for detecting voltage pulses associated therewith further includes:

a first comparator having a non-inverting input connected to said high-pass filter output, an inverting input connected to a first reference voltage and an output;

a second comparator having an inverting input connected to said high-pass filter output, a non-inverting input connected to a second reference voltage and an output;

an OR-gate having a first input connected to said output of said first comparator, a second input connected to said output of said second comparator and an output; and a one shot circuit having an input connected to said OR-gate output and an output providing said voltage pulses associated with said one of said first and second load voltages and with said one of said third and fourth load voltages.

6. The circuitry of claim 2 wherein said means responsive to one of said first and second load voltages and to one of said third and fourth load voltages for detecting voltage pulses associated therewith includes:

a first amplifier circuit having an inverting input connected to a common connection of said output of said third drive device and said signal input of said second drive device, an output connected to a control input of a fifth drive device having a signal input connected to said signal input of said first drive device and an output, and a non-inverting input connected to said output of said fifth drive device;

a sixth drive device having a control input connected to said control input of said second drive device, a signal input connected to said output of said fifth drive device and an output connected to said output of said second drive device;

a seventh drive device having a control input connected to said control input of said fifth drive device, a signal input connected to said signal input of said fifth drive device and an output; and a sense resistor having one end connected to said output of said seventh drive device and an opposite end connected to said output of said sixth drive device.

7. The circuitry of claim 6 wherein said means responsive to one of said first and second load voltages and to one of said third and fourth load voltages for detecting voltage pulses associated therewith further includes:

a second amplifier circuit having an inverting input connected to a common connection of said output of said first drive device and said signal input of said fourth drive device, an output connected to a control input of an eighth drive device having a signal input connected to said signal input of said third drive device and an output, and a non-inverting input connected to said output of said eighth drive device;

a ninth drive device having a control input connected to said control input of said fourth drive device, a signal input connected to said output of said eighth drive device and an output connected to said output of said fourth drive device; and a tenth drive device having a control input connected to said control input of said eighth drive device, a signal input connected to said signal input of said seventh drive device and an output connected to said one end of said sense resistor.

8. The circuitry of claim 7 wherein said means responsive to one of said first and second load voltages and to one of said third and fourth load voltages for detecting voltage pulses associated therewith further includes:

an amplifier circuit having an input connected to said one end of said sense resistor and an output; and a high-pass filter having an input connected to said output of said amplifier circuit and an output.

9. The circuitry of claim 8 wherein said means responsive to one of said first and second load voltages and to one of said third and fourth load voltages for detecting voltage pulses associated therewith further includes:

a comparator having a non-inverting input connected to said high-pass filter output, an inverting input connected to a reference voltage and an output; and a one shot circuit having an input connected to said comparator output and an output providing said voltage pulses associated with said one of said first and second load voltages and with said one of said third and fourth load voltages.

10. The circuitry of claim 8 wherein said first through tenth drive devices are MOS transistors.

11. The circuitry of claim 2 wherein said means responsive to said voltage pulses for controlling activation and deactivation of said first and second control signals includes:

a counter circuit responsive to a desired position value and said voltage pulses for producing a number of control commands; and a control circuit responsive to said number of control commands to produce said first, second, third and fourth control signals.

12. The circuitry of claim 2 wherein said means responsive to said voltage pulses for controlling activation and deactivation of said first and second control signals includes:

a control computer responsive to said voltage pulses for producing a number of control commands; and a control circuit responsive to said number of control commands to produce said first, second, third and fourth control signals.

13. The circuitry of claim 12 further including a charge pump circuit for producing a control voltage greater than the supply voltage;

and wherein said control circuit is responsive to said control voltage to activate said first and third control signals at said control voltage.

* * * * *